(12) United States Patent
Codilian et al.

(10) Patent No.: US 6,920,004 B1
(45) Date of Patent: Jul. 19, 2005

(54) METHOD FOR ADJUSTING A DELAY TIME FOR OPENING A SERVO SECTOR DETECTION WINDOW IN A DISK DRIVE HAVING A SPIRAL TRACK

(75) Inventors: Raffi Codilian, Irvine, CA (US); Charles W. Frank, Jr., Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 433 days.

(21) Appl. No.: 10/112,333

(22) Filed: Mar. 29, 2002

(51) Int. Cl.[7] ............................................. G11B 5/09
(52) U.S. Cl. ................................... 360/51; 360/77.08
(58) Field of Search .............................. 360/51, 77.02, 360/77.08, 48

(56) References Cited

U.S. PATENT DOCUMENTS

| | | | |
|---|---|---|---|
| 4,636,885 A | 1/1987 | Yamada et al. | |
| 4,737,869 A | 4/1988 | Sugaya et al. | |
| 5,119,248 A | 6/1992 | Bizjak et al. | |
| 5,583,712 A | * 12/1996 | Brunelle | .................. 360/77.07 |
| 5,619,387 A | 4/1997 | Ottesen et al. | |
| 6,081,397 A | * 6/2000 | Belser | .......................... 360/51 |
| 2001/0021075 A1 | * 9/2001 | Kitazaki et al. | .............. 360/51 |

OTHER PUBLICATIONS

Masud Mansuripur, Principles of Optical Disk Date Storage, Optical Sciences Center, University of Arizona, Tucson, AZ.

* cited by examiner

*Primary Examiner*—David Hudspeth
*Assistant Examiner*—Varsha A Kapadia
(74) *Attorney, Agent, or Firm*—Milad G. Shara, Esq.; Robroy R. Fawcett, Esq.

(57) ABSTRACT

The present invention may be embodied in a method for adjusting a servo sector detection delay time between detection windows in a disk drive. The disk drive includes a magnetic disk with a spiral track having contiguous storage segments. Each storage segment has a servo sector and a predetermined number of uniformly-sized data sectors. The storage segments are written at a relatively constant linear density along the spiral track. In the method, the magnetic disk is rotated at a constant angular velocity. A servo sector is detected. An adjustable delay time is provided for opening a window to detect a next servo sector. The window is opened after the adjustable delay time expires. A next servo sector is detected in the window. A time between the servo sector detections is measured and the adjustable delay time is adjusted based on the measured time.

6 Claims, 3 Drawing Sheets

METHOD FOR ADJUSTING A DELAY TIME FOR OPENING A SERVO SECTOR DETECTION WINDOW IN A DISK DRIVE HAVING A SPIRAL TRACK

BACKGROUND OF THE INVENTION

1. Field of the Invention

The present invention relates to digital information storage, and more particularly, to a method for adjusting a delay time for opening a servo sector detection window in a disk drive.

2. Description of the Prior Art

A magnetic disk drive provides a nonvolatile disk media for storage of user and application information. The disk media is generally formatted to store the information in concentric rings or tracks. The concentric tracks are followed using embedded servo wedges that are sampled during disk access operations. To switch from one track to another, the disk drive must perform a mechanical seek operation to move a transducer head to the desired track. During a seek, the stored in formation may not be accessed. When the disk drive is providing streaming media information, such as a video or audio information, to a host, the information must be buffered to prevent annoying discontinuities during playback of the streaming media. Also, to increase the storage capacity of the disk drive, the disk media may be divided into zones, with more uniformly-sized data blocks being written between the servo wedges on the outer tracks than are written between the servo wedges on the inner tracks. Nevertheless, the linear circumferential distance of a track wires as its radial distance from the center of the disk varies. Thus, a substantial number of the tracks often have a portion that is unused because it is smaller that the uniformly-sized data blocks. Alternatively, the tracks may have data blocks that straddle servo wedges using techniques requiring increased format overhead.

Accordingly, there exists a need for a disk drive and related techniques for using a magnetic disk media format that efficiently stores information and that allows more continuous information playback from a magnetic disk. The present invention satisfies this need.

SUMMARY OF THE INVENTION

The present invention may be embodied in a method for adjusting a servo sector detection delay time between detection windows in a disk drive. The disk drive includes a magnetic disk with the spiral track having contiguous storage segments. Each storage segment has a servo sector and a predetermined number of uniformly-sized data sectors. The storage segments are written at a relatively constant linear density along the spiral track. In the method, the magnetic disk is rotated at a constant angular velocity. A servo sector is detected. An adjustable delay time is provided for opening a window to detect a next servo sector. The window is opened after the adjustable delay time expires. A next servo sector is detected in the window. A time between the servo sector detections is measured and the adjustable delay time is adjusted based on the measured time.

In more detailed feature of the invention, the adjustable delay time may be adjusted by setting the adjustable delay time to be equal to the measured time. Alternatively, the adjustable delay time may be adjusted by setting the adjustable delay time to be equal to the measured time plus a spiral correction factor.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
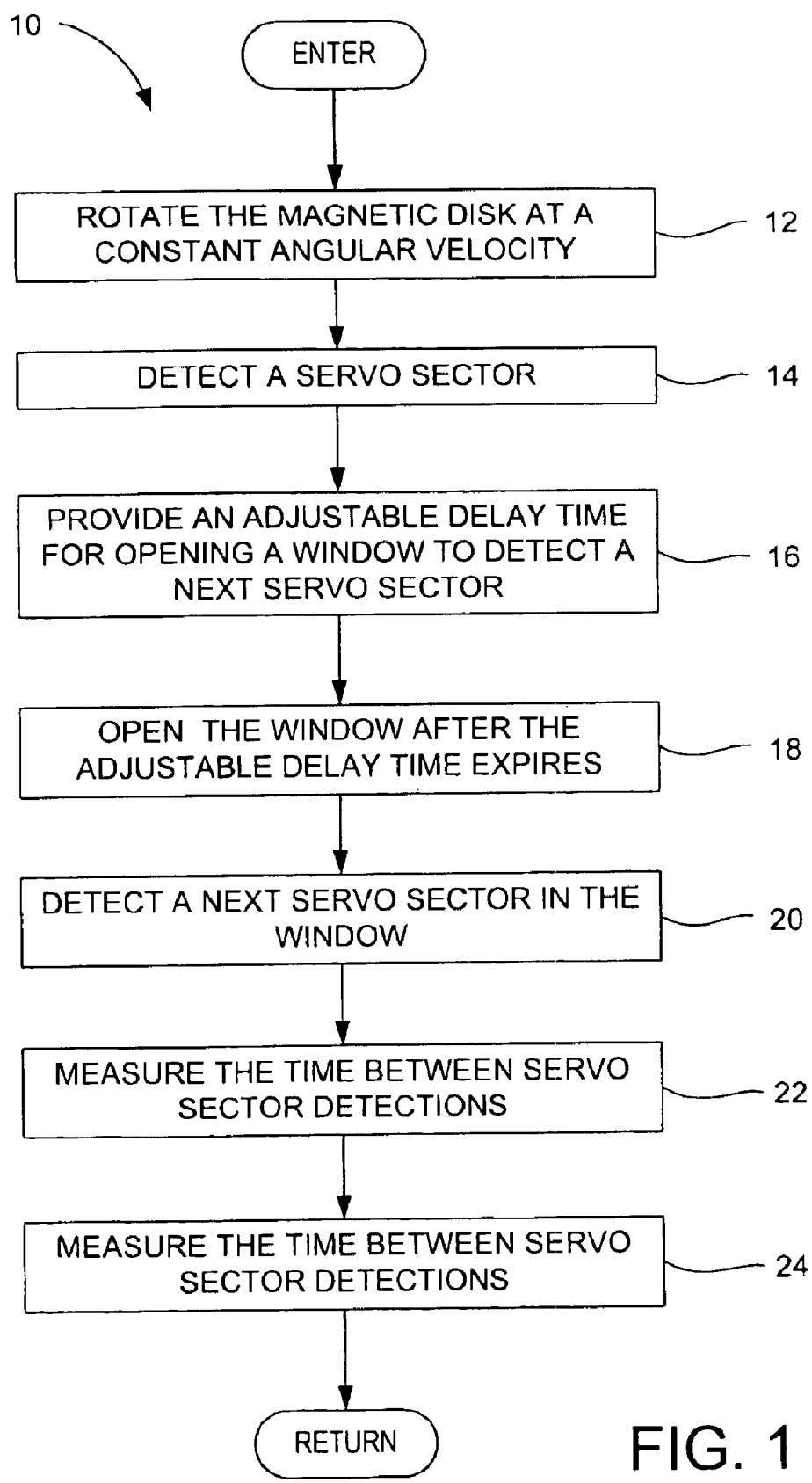
FIG. 1 is a flow chart illustrating an embodiment of a method for adjusting a servo sector detection time between detection windows for reading servo sectors, according to the present invention.
Figure 2:
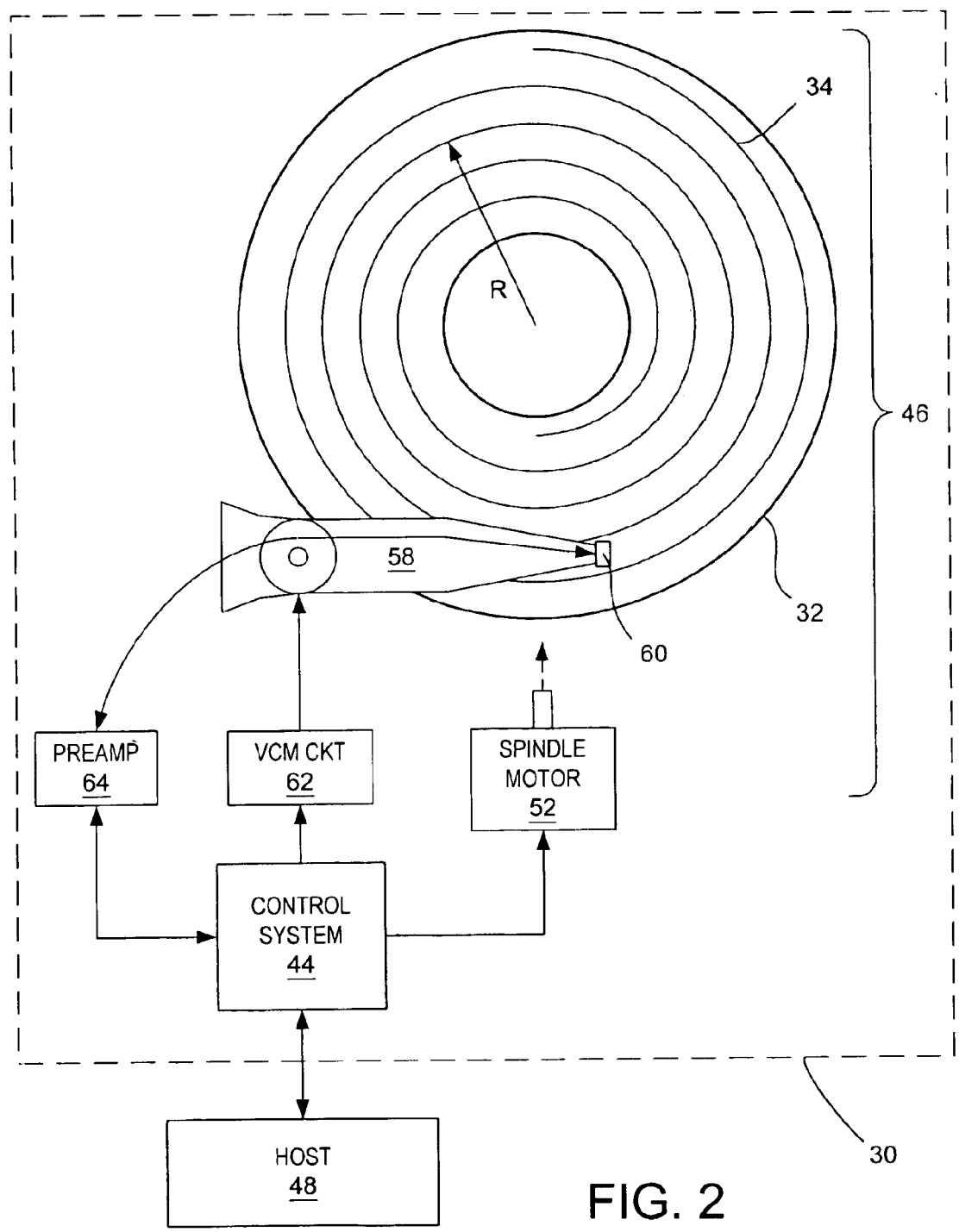
FIG. 2 is a block diagram of a computer system having a disk drive with a spiral track for implementing the method of FIG. 1.
Figure 3:
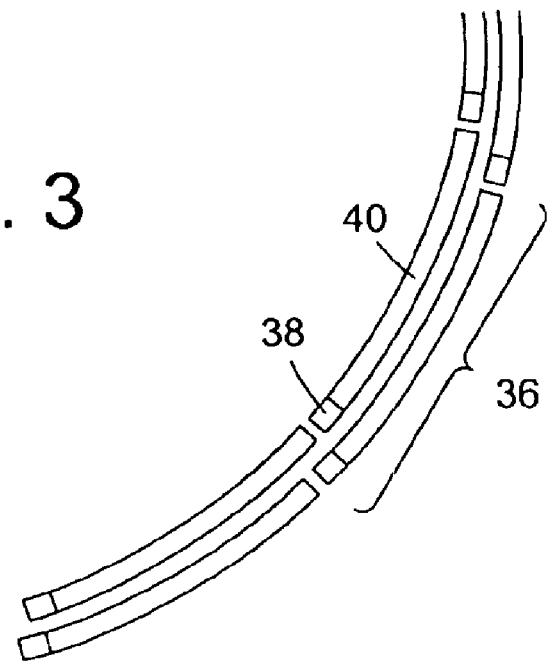
FIG. 3 is a schematic diagram of storage segments forming the spiral track of FIG. 2.
Figure 4:
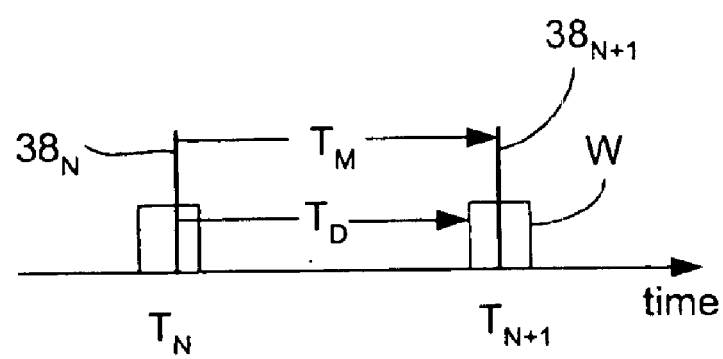
FIG. 4 is a graph showing the adjustable delay time in relation to the detection window.

With reference to FIGS. 1 through 4, the present invention may be embodied in a method 10 (FIG. 1) implemented in a disk drive 30 (FIG. 2) for adjusting a servo sector detection delay time $T_D$ between detection windows W (FIG. 4). The disk includes a magnetic disk 32 with a spiral track 34 having contiguous storage segments 36 (FIG. 3). Each storage segment has a servo sector 38 and a predetermined number of uniformly-sized data sectors 40. The storage segments are written at a relatively constant linear density along the spiral track. In the method, the magnetic disk is rotated at a constant angular velocity (step 12). A servo sector $38_N$ is detected (step 14). An adjustable delay time $T_D$ is provided for opening a window W to detect a next servo sector (step 16). The window is opened after the adjustable delay time expires (step 18). A next servo sector $38_{N+1}$ is detected in the window (step 20). The time $T_M$ between the servo sector detections is measured (step 22) and the adjustable delay time is adjusted based on the measured time (step 24).

The spiral track 34 allows the magnetic disk drive 30 to deliver long sequential reads of stored information without single-track seeks. For example, an entire movie may be played by the host 40 with the disk drive performing few, if any, single-track seeks. The spiral track techniques of the disk drive also may be advantageous for use in a back up system where data storage capacity and efficiency is favored over seek performance.

The adjustable delay time $T_D$ may be adjusted by setting the adjustable delay time to be equal to the measured time $T_M$. Alternatively, the adjustable delay time may be adjusted by setting the adjustable delay time to be equal to the measured time plus a spiral correction factor.

The spiral correction factor may account for the radial position R of a turn of the spiral track 34 with respect to an adjacent turn. For example, track following may commence near an outer radius of the disk 30. As a transducer head 60 follows the spiral track, it moves toward an inner radius of the disk. After each full rotation of the disk, the head is one turn closer to the inner radius. Accordingly, because the radius decreases, the linear distance along a single turn of the spiral track decreases. The storage segments 36, however, may be written at a relatively constant linear density so that each storage segment occupies a relatively constant linear length along the spiral track. With the disk rotating at a constant angular velocity, the adjustable delay time increases with each disk rotation. This increase in the adjustable delay time may be addressed by the spiral correction factor. Another factor may account for the width of the window W.

The disk drive 30 includes a control system 44 and a head-disk assembly (HDA) 46. The control system includes circuitry and processors that control the HDA and that provide an intelligent interface between a host 48 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor. The HDA may include a spindle motor 52, at least one disk 32 having a magnetic media surface for providing the spiral track 34, a rotary actuator 58, the transducer head 60, a voice coil motor (VCM) circuit 62, and a preamplifier 64.

The magnetic media surface is accessed using the heat 60. The spiral track 34 on the media surface may be divided into the storage segments. Each storage segment may begin with the servo sector 38 which is followed by the data sectors 40. The data sectors may include data blocks, each generally storing 512 data bytes. Each data block may be addressed using a logical block address (LBA).

A typical media surface may have an inner radius of about 0.74 inches and an outer radius of about 1.74 inches. The media surface may be formatted such that the spiral track 34 has a turn-to-turn spacing of about 0.00002 inches. The head 60 typically includes a read head and a write head. Ideally, the read and write head are aligned over the same track during track following. However, the rotary actuator 58 may unavoidably introduce a skew or offset of several turns between the read and write heads. During a write operation, the read head may be required to read servo sectors 38 on a nearby track. Because the turn-to-turn spacing is so small, the servo sectors of adjacent and nearby turns may be substantially aligned with the servo sectors of the subject turn, and acceptable track following performance may be obtained using a nominal guard band space between the contiguous storage segments 36.

Also, the media surface format may have "zone" boundaries associated with step changes in the linear density of the storage segments 36, and/or integral changes in the number of data sectors 40 per storage segment. If the read and write heads are offset from each other by a few turns of the spiral track, then a guard band of a few turns may be needed at the zone boundaries.

We claim:

1. In a disk drive having a magnetic disk with a spiral track including contiguous storage segments, each storage segment including a servo sector and a predetermined number of uniformly-sized data sectors, the storage segments being written at a relatively constant linear density along the spiral track, a method for adjusting a servo sector detection delay time between sample time windows for reading the servo sectors, comprising:

rotating the magnetic disk at a constant angular velocity;

detecting a servo sector;

providing an adjustable delay time for opening a window to detect a next servo sector;

opening the window after the adjustable delay time expires;

detecting a next servo sector in the window;

measuring a time between the servo sector detections; and adjusting the adjustable delay time based on the measured time.

2. A method for adjusting a servo sector detection delay time as defined in claim 1, wherein adjusting the adjustable delay time comprises setting the adjustable delay time to be equal to the measured time.

3. A method for adjusting a servo sector detection delay time as defined in claim 1, wherein adjusting the adjustable delay time comprises setting the adjustable delay time to be equal to the measured time plus a spiral correction factor.

4. A disk drive, comprising:

a magnetic disk with a spiral track having contiguous storage segments, wherein each storage segment includes a servo sector and a predetermined number of uniformly-sized data sectors, and the storage segments are written at a relatively constant linear density along the spiral track;

means for rotating the magnetic disk at a constant angular velocity;

means for detecting a servo sector;

means for providing an adjustable delay time for opening a window to detect a next servo sector;

means for opening the window after the adjustable delay time expires;

means for detecting a next servo sector in the window;

means for measuring a time between the servo sector detections; and means for adjusting the adjustable delay time based on the measured time.

5. A disk drive as defined in claim 4, wherein the means for adjusting the adjustable delay time comprises means for setting the adjustable delay time to be equal to the measured time.

6. A disk drive as defined in claim 4, wherein the means for adjusting the adjustable delay time comprises means for setting the adjustable delay time to be equal to the measured time plus a spiral correction factor.

* * * * *